(12) United States Patent
McGinty et al.

(10) Patent No.: US 12,237,939 B2
(45) Date of Patent: *Feb. 25, 2025

(54) METHODS TO GENERATE COMMUNICATION CHANNEL FOR DATA OBJECTS

(71) Applicant: Salesforce, inc., San Francisco, CA (US)

(72) Inventors: Michael Patrick McGinty, Alameda, CA (US); Ronald Jay Hemphill, Washington DC, DC (US); Sreejesh Divakaran Nair, Tampa, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,559

(22) Filed: Nov. 1, 2023

(65) Prior Publication Data

US 2024/0137239 A1 Apr. 25, 2024
US 2024/0235873 A9 Jul. 11, 2024

Related U.S. Application Data

(63) Continuation of application No. 17/649,509, filed on Jan. 31, 2022, now Pat. No. 11,863,338.

(51) Int. Cl.
*H04L 12/18* (2006.01)
*H04L 51/56* (2022.01)

(52) U.S. Cl.
CPC ............ *H04L 12/185* (2013.01); *H04L 51/56* (2022.05)

(58) Field of Classification Search
CPC .............................. H04L 12/185; H04L 51/56
See application file for complete search history.

(56) References Cited

U.S. PATENT DOCUMENTS

| | | | |
|---|---|---|---|
| 10,986,038 B1* | 4/2021 | Montazeri | H04L 47/828 |
| 11,310,295 B1* | 4/2022 | Demmer | H04L 65/4038 |
| 2019/0026298 A1* | 1/2019 | Jin | H04L 12/1822 |
| 2021/0026523 A1* | 1/2021 | Jamison | G06F 40/186 |
| 2021/0240460 A1* | 8/2021 | Hahn | H04L 67/306 |
| 2021/0243150 A1* | 8/2021 | Vasamsetti | H04L 12/185 |
| 2021/0243571 A1* | 8/2021 | Gibbs | H04W 4/12 |

* cited by examiner

*Primary Examiner* — Mohamed A. Wasel
(74) *Attorney, Agent, or Firm* — Holland & Hart LLP

(57) ABSTRACT

An application server may receive, via a user interface of a cloud-based data management platform storing a set of data objects, a user input to generate a communication channel of a group-based communication platform that is separate from the cloud-based data management platform. In some examples, the communication channel may be for a data object of the plurality of data objects. The application server may then retrieve a group of users that are linked to the data object within the cloud-based data management platform and display a list of options for generating the communication channel. The list of options may include the group of users for including in the communication channel, a privacy level for the communication channel, and an identifier of the communication channel. The application server may generate an executable packet of instructions and transmit the executable packet of instructions for ingesting into the group-based communication platform.

20 Claims, 12 Drawing Sheets

METHODS TO GENERATE COMMUNICATION CHANNEL FOR DATA OBJECTS

CROSS REFERENCES

The present Application for Patent in a continuation of U.S. patent application Ser. No. 17/649,509 by McGinty et al., entitled "Methods to Generate Communication Channel for Data Objects," filed Jan. 31, 2022, which is assigned to the assignee hereof and which is expressly incorporated by reference herein.

FIELD OF TECHNOLOGY

The present disclosure relates generally to database systems and data processing, and more specifically to methods to generate communication channel for data objects.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A group-based communication platform may support communication channels configured for group-based communications. Each channel may be accessible by a specific set of users, and respective users may post messages and files to a channel. However, the group-based communication platform and the cloud platform may be implemented in or supported by separate computing systems or programs or may otherwise have interoperability limitations. As such, some features of the communication flow establishment may be incompatible with the communication platform, which may result in workflow inefficiencies and decreased user satisfaction.

DETAILED DESCRIPTION

Figure 1:
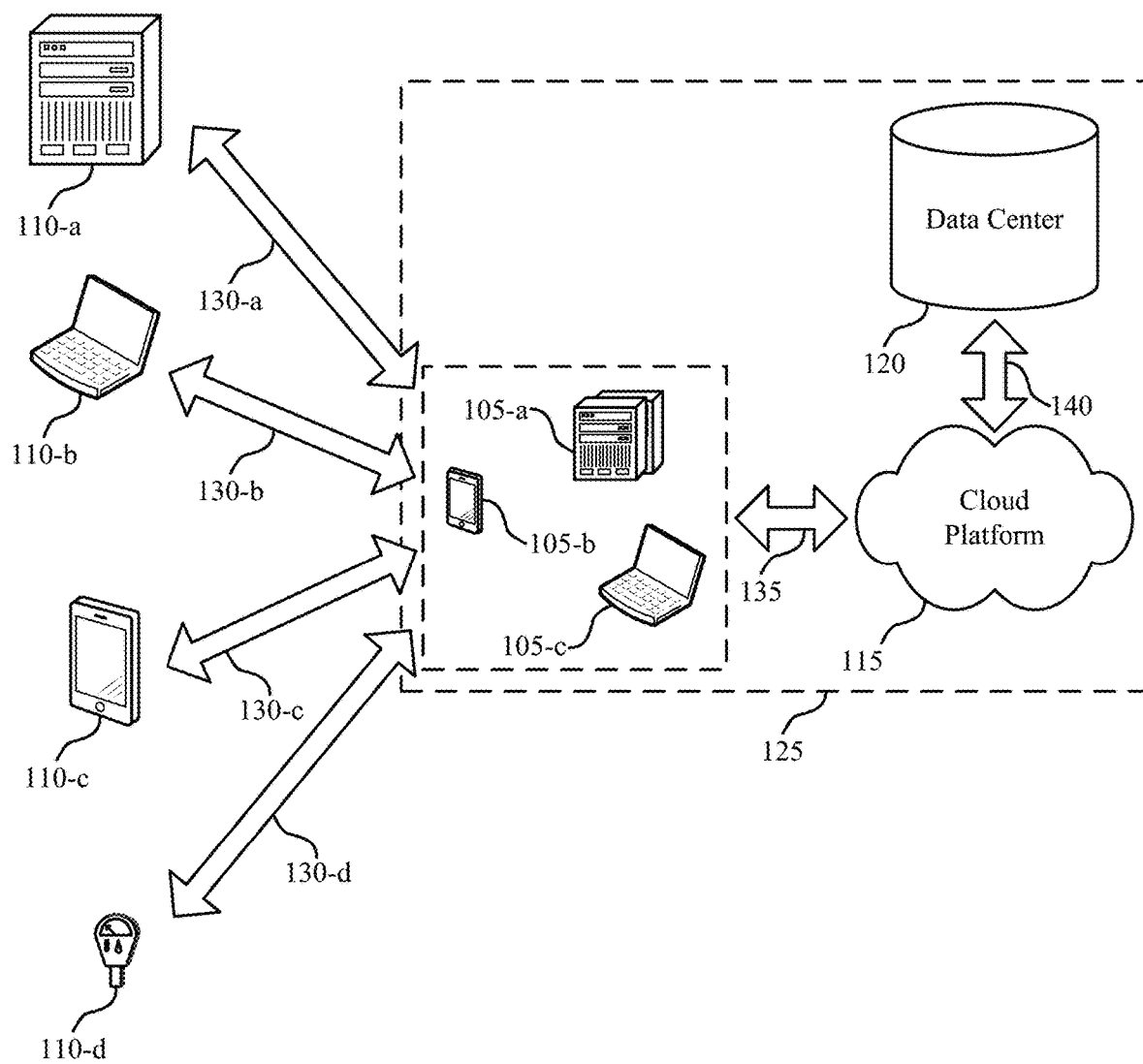
FIG. 1 illustrates an example of a communication channel creation system that supports methods to generate communication channel for data objects in accordance with aspects of the present disclosure.

Techniques described herein support generation of one or more communication channels associated with a data object within a data management platform. A user of a database system (or tenant in the case of a multi-tenant database system) may store information and data for users, customers, organizations, etc. in a database and manage the stored information with a program such as a data management platform. For example, a user may manage and store data and metadata for exchanges, opportunities, deals, assets, customer information, and the like. The data management platform may support multiple data objects (e.g., data records) and a group of users may be linked to each data object. For example, one or more users may follow or otherwise be granted access to review and/or edit one or more data objects or records. An organization or tenant may use communication channel generation depicted herein to schedule and manage communications between the users of the organization or tenant.

A group-based communication platform may support a quantity of channels configured for group-based communications. Each channel may be accessible by a specific set of users based on permissions that are set for that channel, and respective users may post messages to a channel. In some examples, administrative users or employees associated with the organization or a tenant of the organization (e.g., a marketing team) may communicate on a communication channel on a communication platform (e.g., group-based communication platform). For example, the communication platform may support communication channels that are organized by topic, and team members may use these communication channels (e.g., chat threads) to discuss about those topics. Conventionally, the communication platform may be separate from the data management platform (e.g., different servers, different programs or applications, etc.), and data associated with the data management platform may be confined to computing systems that support the data management platform. In other words, there may not be a way to establish one or many channels associated with a data object (e.g., data record) in a separate communication platform directly from a page in the data management platform, which may limit some aspects of working within the data management platform. Additionally, users of the data management platform may not be able to set a privacy level for a communication channel, which may limit capabilities associated with the channel.

Techniques described herein support generation of a communication channel in a communication platform from a data management platform (e.g., directly from a page displaying a data record within the data management platform). Thus, techniques described herein provide communications between a data management platform and a communication platform. For example, the techniques described herein may enable users of the data management platform to create a communication channel associated with various data objects directly from the data management platform. Likewise, the techniques described herein may enable users to interact with the data management platform from within the communication platform. The described techniques may support improved workflow efficiency, reduced communication resource overhead, and higher user satisfaction, among other benefits.

Aspects of the present disclosure may provide for improved cross-platform functionality between a data management platform and a communication platform. In particular, techniques of the present disclosure provide for an automatic system to create a communication channel from a record page of a data management platform, thus improving the user experience. In some examples, a user of the data management platform may generate a communication channel using an "action" button located on a record page. In some examples, the data management platform may receive, via a user interface of the data management platform storing a set of data objects, a user input to generate a communication channel of a group-based communication platform that is separate from the data management platform. In some examples, the communication channel may be for a data object of the set of data objects stored in the data management platform.

In some examples, in response to receiving the user input, the data management platform may retrieve a group of users that are linked to the data object within the data management platform. A user may select the "action" button on the records page to input fields in a form. The data management platform may then display (in response to receiving a selection of the "action" button) a list of options for generating the communication channel. The list of options may include the group of users (e.g., identifiers of members to include in the conversation) for including in the communication channel, a privacy level for the communication channel (e.g., an indication of whether the discussion is public or private), and an identifier of the communication channel (e.g., an initial conversation name). The user may then submit the form, and once the form is submitted, a communication channel is created with the members provided in the form and the visibility set to public or private. For instance, the data management platform may generate an executable packet of instructions for ingesting into the group-based communication platform based on an input to the list of options displayed to the user. The data management platform may then transmit the executable packet of instructions for ingesting into the group-based communication platform. Thus, aspects of the present disclosure provide an association between a data record and a communication channel.

Aspects of the present disclosure may be implemented to realize one or more of the following advantages. The described techniques may provide improved cross-platform compatibility between a data management platform and a communication platform. For example, the techniques described herein may enable users of the communication platform to interact with (e.g., affect, change, update, modify) data records stored at or otherwise controlled by the data management platform. Similarly, the described techniques may enable the data management platform to display information related to a data record within the communication platform. By supporting bidirectional communications between the data management platform and the communication platform, the described techniques may enable users to communicate with greater efficiency, lower communication resource overhead, reduced latency, and higher user satisfaction, among other benefits.

Aspects of the disclosure are initially described in the context of an environment supporting an on-demand database service. Aspects of the disclosure are illustrated by and described with reference to data processing systems, user interfaces, and process flows. Aspects of the disclosure are further illustrated by and described with reference to apparatus diagrams, system diagrams, and flowcharts that relate to methods to generate communication channel for data objects.

FIG. 1 illustrates an example of a system 100 for cloud computing that supports methods to generate communication channel for data objects in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120. A cloud platform 115 may include one or more application servers that support a communication platform, a data management platform, a service that manages communications between the data management platform and the communication platform, a global endpoint, or a combination thereof. In some examples, these platforms, services, and endpoints may be supported by the same application server. In other examples, these platforms, services, and endpoints may be supported by separate application servers.

As described herein, a data management platform may include a communication service that may enable users to develop and manage communications between a tenant of a multi-tenant system (e.g., a cloud client 105) and a set of users (e.g., customers) corresponding to the tenant (e.g., contacts 110). In some cases, the communication service may enable communications between multiple users of a cloud-based data management platform (e.g., a cloud client 105) In some cases, these users may communicate within a communication channel of a communication platform. However, systems may not support generation of communication channel at the communication platform from the cloud-based data management platform between the communication process flow management service and the communication platform. In other words, users may be unable to interact with (e.g., generate, update, change, modify) a communication channel from within the data management platform. Additionally or alternatively, the users may be unable to receive updates or data objects associated with a communication channel within the communication platform for viewing, discussion, and subsequent interaction.

Aspects of the present disclosure support generation of communication channel associated with a group-based communication platform. In particular, aspects of the present disclosure provide for communication channel generation from a cloud-based data management platform, which may enable users to develop and manage communication channels (e.g., add people to communication channel, set privacy level of the communication channel) from within the cloud-based data management platform. For example, an authenticated user of the cloud-based data management platform may update a configuration of a communication channel by interacting with a user interface associated with the cloud-based data management platform. Moreover, the techniques described herein may enable users to interact with communication channel on different devices (e.g., smartphones, tablets, mobile devices).

In some examples, a user may perform an authentication procedure to connect an account associated with a communication platform with an account associated with a data management platform. Once authenticated, the user may use the data management platform to interact with communication channels stored at or otherwise controlled by the communication platform. The data management platform may store the account information of the user, and may use this information to authenticate subsequent requests from the user.

As an example, a user may submit a request to generate a communication channel by interacting with a user interface associated with a data management platform. For example, a user interacting with a data record stored in the data management platform may use an "action" button to initiate generation of a communication channel associated with the data record. The user may further indicate an initial conversation name, an indication of whether the discussion is public or private, and identifiers of members to include in the conversation. The user may then submit the request. Once submitted, the request may be sent to an intermediary service that manages communications between the communication platform and the data management platform. The intermediary service may perform an authentication procedure to verify the identity of the user. Once authenticated, the request may be routed to the communication platform. In some examples, the communication platform may generate a communication channel in accordance with the request. In some instances, the user may add more participants to the communication channel (after generation). Additionally or alternatively, the user may associated the generated communication channel with an existing communication channel.

Thus, the techniques described herein may enable users to interact with the communication platform from the data management platform (e.g., via an intermediary service supporting application programming interface (API)), and may also enable the data management platform to post or display information within the communication platform. Thus, the described techniques may support generation of communication channel from the cloud-based data management platform.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
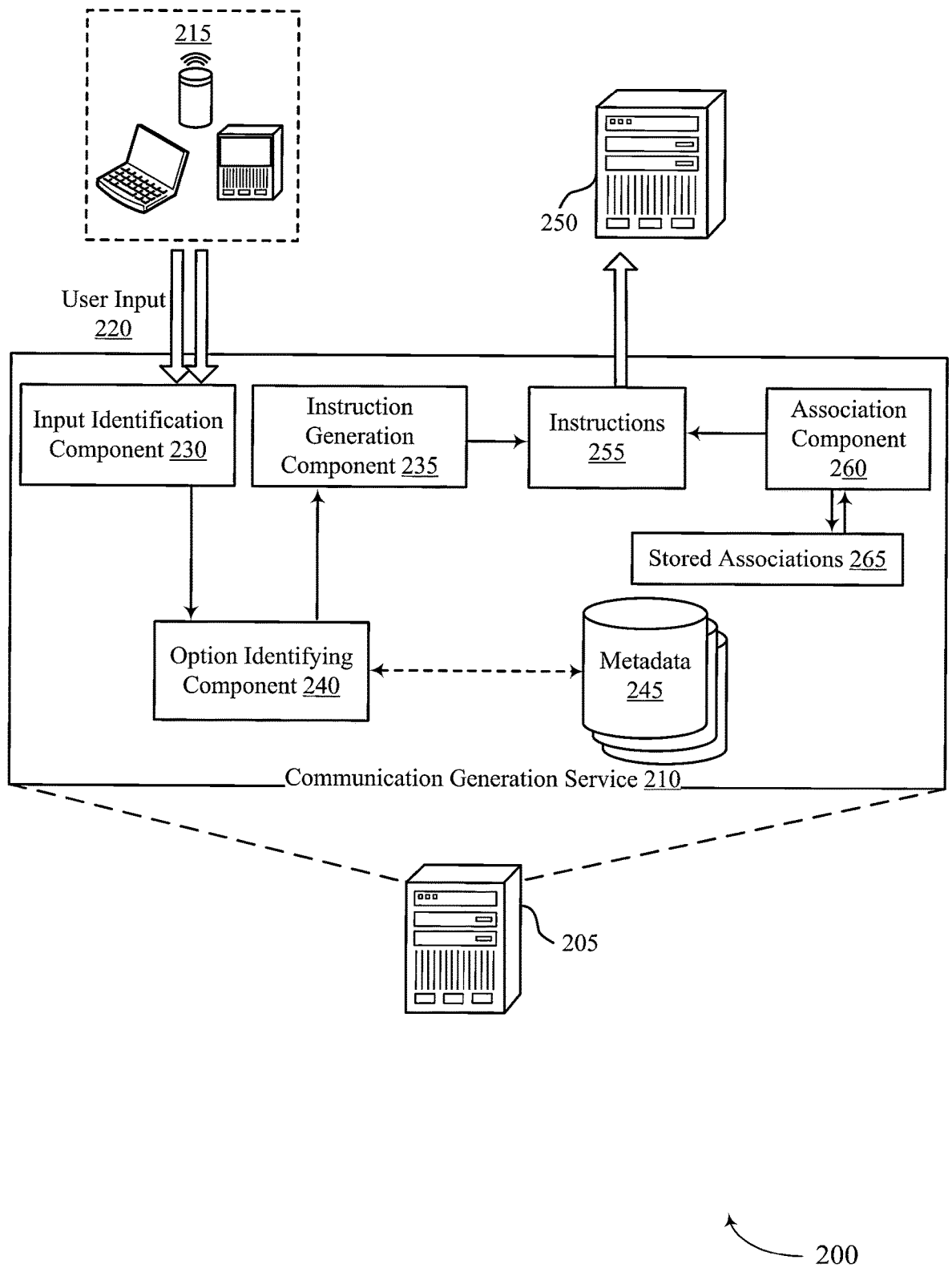
FIG. 2 illustrates an example of a block diagram that supports methods to generate communication channel for data objects in accordance with aspects of the present disclosure.

FIG. 2 illustrates an example of a block diagram 200 that supports methods to generate communication channel for data objects in accordance with aspects of the present disclosure. The devices of block diagram 200 may implement or be implemented by aspects of the data processing system 100 as described in FIG. 1. The block diagram 200 includes a server 205 which may be implemented by aspects of a cloud platform 115 or a subsystem 125 described with reference to FIG. 1. The server 205 executes a communication generation service 210. The block diagram 200 further includes a user device 215 (depicted as a cluster of devices), and a communication platform 250, which may be implemented by aspects of a cloud platform 115 or a subsystem 125 described with reference to FIG. 1. Example user devices 215 may include computing devices, smart devices, virtual assistants, etc., and the user device 215 may include servers supporting such systems (e.g., search servers, application servers, etc.). The user device 215 may transmit a set of user input to the server 205. The set of user input may be used to generate a communication channel using a user interface supported by the server 205. In some examples, the systems or servers supporting the server 205 (e.g., data management platform) may include computing systems that are logically or physically separated from systems or servers supporting the communication platform 250.

As described herein, the block diagram 200 may support creation, configuration, and implementation of various communication channels that provide communications between a set of users (e.g., a set of users associated with a tenant). For example, the users associated may use the communication generation service 210 to perform actions that include processor-executable instructions for generation of communication channels. For example, a user may input an instruction that, when executed by a processor, selects users (e.g., customers) to be included in a communication channel.

The communication platform 250 may support a chat or instant messaging service used for various business functionalities. For example, teams associated with a tenant (of a multi-tenant system supported by the block diagram 200) may use the communication platform 250 to manage communication channels supported by the data management platform (e.g., server 205). Users may use the communication platform 250 to discuss aspects of the data management platform. For example, users of the communication platform 250 may decide to reconfigure or interact with a data record included in the server 205 (e.g., data management platform).

However, because the server 205 and the communication platform 250 may be implemented in separate computing systems and/or executed by separate applications, some features of the server 205 may be incompatible with the communication platform 250. Thus, if a user wishes to communicate with another user within the communication platform 250, the user may be unable to generate the communication channel from the data management platform (hosted by server 205). Further, a user may be unable to post or otherwise display data associated with the data record into a communication channel of the communication platform 250 without manually inputting the data into a chat window of the communication platform 250.

Techniques described herein may support improved cross-platform compatibility between the server 205 hosting the data management platform and the communication platform 250. An instruction interface of the server 205 may include an input identification component 230. The server 205 may receive a user input 220 via the instruction interface. The user input 220 may include a user input to generate a communication channel of a group-based communication platform (e.g., communication platform 250) that is separate from the cloud-based data management platform (hosted by server 205). In some examples, the communication channel may be for a data object of a set of data objects stored in the cloud-based data management platform. For example, a user may use an "action" button displayed on a user interface to initiate generation of a communication channel. Upon initiation of the generation of communication channel, the instruction interface of the server 205 may display a list of options for generating the communication channel. In some examples, the list of options may include a group of users for including in the communication channel, a privacy level for the communication channel, and an identifier of the communication channel.

In response to displaying the list of options, the input identifying component 230 may receive an input to the list of options for generating the communication channel. An option identifying component 240 may identify a name of the communication channel based on the input to the list of options, Additionally or alternatively, the option identifying component 240 may identify whether the communication channel is public or private based on the input to the list of options. In some examples, the option identifying component 240 may identify a selection of a subset of group of users for including in the communication channel based on the input to the list of options. In some examples, the option identifying component 240 may identify the subset of the group of users using metadata 245 for different clients (e.g., cloud clients 105 of FIG. 1).

The option identifying component 240 may generate an executable packet of instructions for ingesting into the group-based communication platform based on the input to the list of options. For example, the option identifying component 240 may generate the executable packet of instructions based on identifying the name of the communication channel, whether the communication channel is public or private, and the selection of the subset of group of users. In some examples, the user may initiate generation of a communication channel (using an "action" button) associated with a data object. The interface associated with the server 205 may display a list of users associated with the data record. In some examples, the group of users may include a first group of users that have access to the data object, a second group of users that follow the data object, or a combination thereof. The user may select a subset of users to be included in as participants in the communication channel. Additionally or alternatively, the user may indicate whether the communication channel is to be public, private (e.g., participants may have access to the communication channel) or partially private (e.g., a subset of users in addition to the participants may have access to the communication channel).

The instruction generation component 230 may transmit the executable packet of instructions for ingesting into the communication platform 250. Upon ingestion, the communication platform 250 may generate a communication channel with the subset of users as participants. In some examples, an association component 260 may determine an existing communication channel in the communication platform 250 for the data object of the set of data objects. For instance, after generation of a communication channel, the user may choose to associate the channel with an existing communication channel. Additionally or alternatively, the association component 260 may associate the generated communication channel with an existing communication channel using stored associations 265.

In some examples, the interface at the server 205 may display a list of communication channels for the user. For example, the user may be a member of a set of communication channels included in the list of communication channels. the user may select an option to display all communication channels that the user is a part of Additionally or alternatively, the input identification component 230 may receive a second user input to display a list of communication channels of the communication platform 250 associated with the data object of the set of data objects. The communication generation service 210 may display a list of communication channels associated with the data object in response to receiving the second user input.

In some examples, the input identification component 230 may receive second input to the list of options for generating a second communication channel. The instruction generation component 235 may generate a second executable packet of instructions for ingesting into the communication platform 250 based on the second input to the list of options. In some examples, the communication channel and the second communication channel may both be for a common data object. That is, components of the block diagram 200 may support generation of multiple communication channels associated with a common data object. Additionally or alternatively, the components of the block diagram 200 may support generation of multiple communication channels associated with different data objects. In some examples, different communication channels may include same or different groups of users and may have same or different privacy levels. In some examples, the associated component 260 may associate a generated communication channel with a second data object of the set of data objects.

Figure 3:
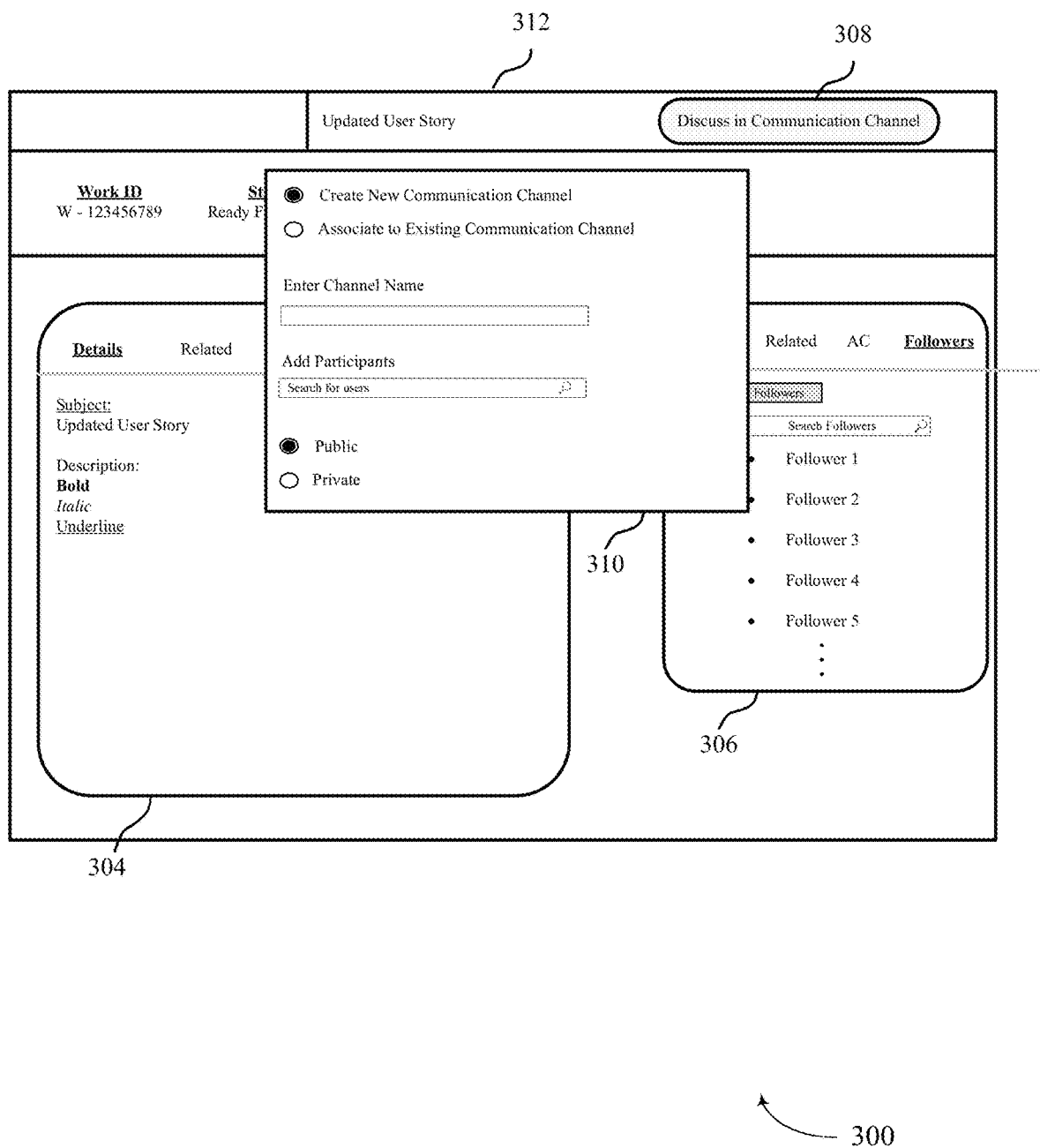
FIG. 3 illustrates an example of a user interface that supports methods to generate communication channel for data objects in accordance with aspects of the present disclosure.

FIG. 3 illustrates an example of a user interface 300 that supports methods to generate communication channel for data objects in accordance with aspects of the present disclosure. The user interface 300 may correspond to a desktop or mobile or other user interface type. In some cases, additional user interface types may be supported for implementing generating communication channels associated with a data object (e.g., data record). The user interface 300 may support a view of communication channel generation from a data management platform.

As depicted herein, a user of a device may be associated with a tenant of a multi-tenant database which may use the cloud platform for data management. The user interface 300 may be a part of a cloud platform that supports multiple data records. The user interface 300 may display a view of a data object supported by an application server. As depicted in the example of FIG. 3, the user interface 300 may support a set of data records configured for use in an application. As depicted in the example of FIG. 3, the set of data records may include a data record "updated user story" included in the pane 312. The user interface 300 may support generation of communication channel associated with a relevant data record. In the example depicted herein, a user device may generate a communication channel associated with the data record "updated user story."

The user interface 300 may include a section 304 indicating details related to the data record. Additionally or alternatively, the user interface 300 may include a section 306 identifying followers associated with the data record. As depicted in the example of FIG. 3, in addition to the list of followers displayed on the user interface 300, the user may be able to search for additional followers. A user may select "discuss in communication channel" option 308 to generate a communication channel. Upon receiving the user input, the cloud-based data management platform including the user interface 300 may determine that the user input is to generate a communication channel of a group-based communication platform that is separate from the cloud-based data management platform.

The user interface 300 may display the list of options 310 upon receiving a selection of option 308 from the user. The list of options 310 may include an option to create a new communication channel and an option to associate a communication channel to an existing communication channel. Additionally, the list of options 310 may include an identifier of the communication channel, a group of users for including in the communication channel, and a privacy level for the communication channel. As depicted in the example of FIG. 3, the list of options 310 may include an input box for the user to enter a channel name. The list of options 310 may further include an option for the user to add participants. In some examples, the data management platform may retrieve a group of users associated with the data record. The group of users that are linked to the data object may include at least one of a first group of users that have access to the data object, a second group of users that follow the data object, or a combination thereof. Additionally or alternatively, the list of options 310 may include an option to make the communication channel public and an option to make the communication channel private.

The data management platform may then generate an executable packet of instructions for ingesting into the group-based communication platform based on an input to the list of options 310. The executable packet of instructions may include at least one of a communication channel identifier, a user identifier for a creator the executable packet of instructions, a user identifier for a modifier of the executable packet of instructions, a user identifier for a member of the data object, a user identifier for an owner of the data object, a privacy indicator, a record identifier, or a combination thereof. The data management platform may then transmit the executable packet of instructions for ingesting into the group-based communication platform. Thus, by implementing the techniques for generating a communication channel, the user interface 300 may improve user experience.

Figure 4:
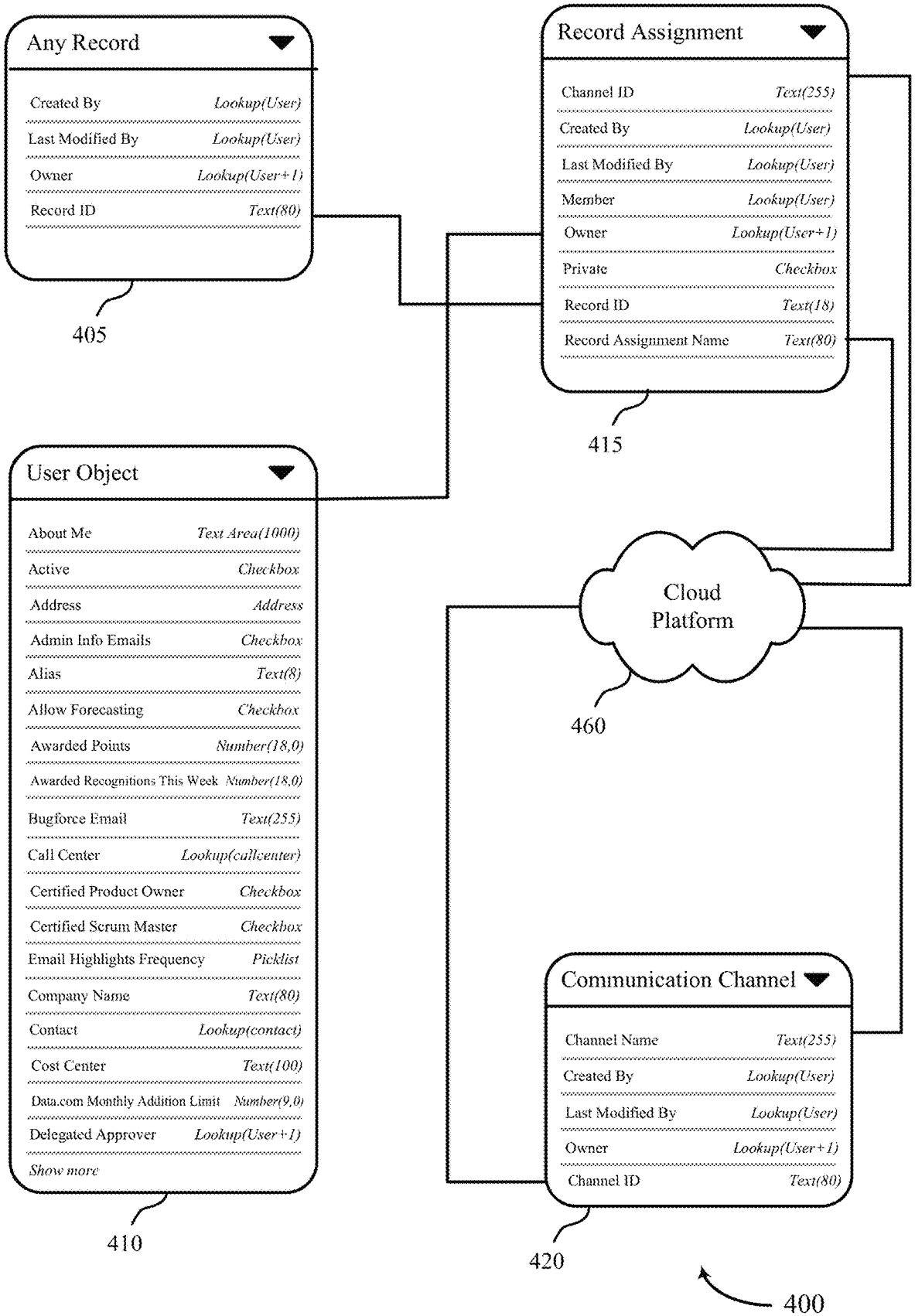
FIG. 4 illustrates an example of an instruction generation method that supports methods to generate communication channel for data objects in accordance with aspects of the present disclosure.

FIG. 4 illustrates an example of an instruction generation method 400 that supports methods to generate communication channel for data objects in accordance with aspects of the present disclosure. The instruction generation method 400 may be used to generate a communication channel on a communication platform.

A user of a cloud-based data management platform may use one or more options displayed on a user interface of the cloud-based data management platform to generate a communication channel on a group-based communication platform. A user may provide an input to a list of options to create a new communication channel. In the example of FIG. 4, the data management platform may generate an executable packet of instructions for ingesting into the group-based communication platform based on an input to the list of options. The executable packet of instructions may include record assignment 415. The data management platform may use parameters for a record in a table 405 and parameters for a user object in a table 410 may be used to generate record assignment 415. The record assignment 415 may include at least one of a communication channel identifier, a user identifier for a creator the executable packet of instructions (created by), a user identifier for a modifier of the executable packet of instructions, a user identifier for a member of the data object, a user identifier for an owner of the data object, a privacy indicator, a record identifier (record ID and record assignment name), or a combination thereof. The record identifier in the record assignment 415 may be received from the parameters for the record in the table 405. Additionally or alternatively, the owner of the record assignment 415 may be received from the parameters for the user object in the table 410. The data management platform then ingests the record assignment 415 to a communication platform through a cloud platform 460. The communication platform may generate a communication channel 420 upon reception of the set of executable instructions (record assignment 415). In some examples, the communication channel 420 may include a channel name, an indicator of the creator of the channel, an indicator of the modifier of the channel, an indicator of the owner of the channel and a channel identifier.

Figure 5:
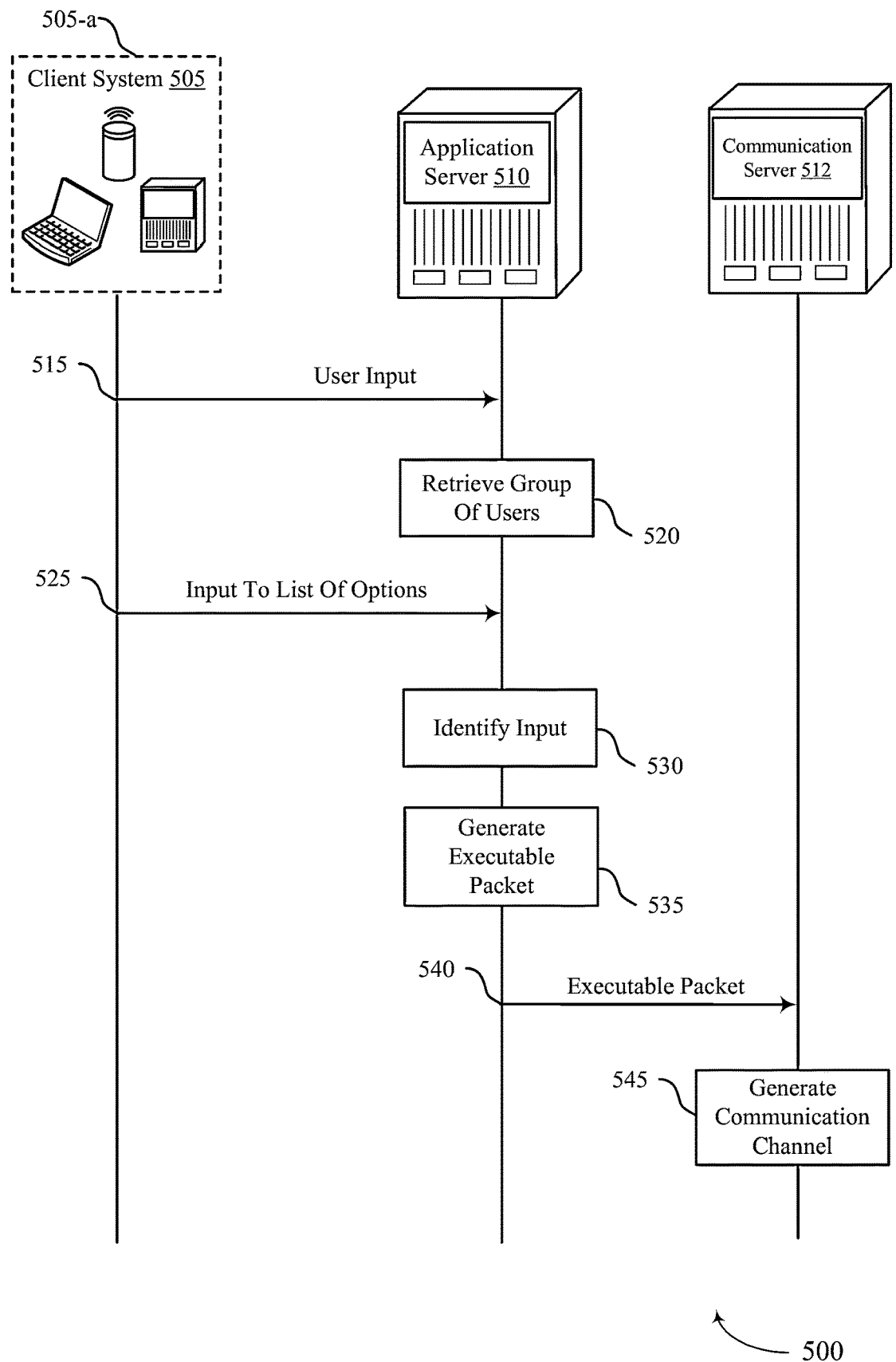
FIG. 5 illustrates an example of a process flow that supports methods to generate communication channel for data objects in accordance with aspects of the present disclosure.

FIG. 5 illustrates an example of a process flow 500 that supports methods to generate communication channel for data objects in accordance with aspects of the present disclosure. The process flow 500 may implement aspects of system 100 of FIG. 1 and includes a user device 505 (e.g., a set of user devices), which may be examples of devices associated with cloud client 105 of FIG. 1. Example user devices 505 include computing devices, smart devices, virtual assistants, etc. and the user device 505 may include servers supporting such systems (e.g., search servers, application servers, etc.). The process flow 500 further includes an application server 510, which may be an example of aspects of cloud platform 115 of FIG. 1 and may be an example of aspects of the application server 205 of FIG. 2 (e.g., a database system, application server, etc.), and may support a cloud-based data management platform. The process flow 500 further includes a communication server 512, which may be an example of aspects of the communication platform 250 of FIG. 2 (e.g., a database system, application server, etc.), and may support a group-based communication platform.

The application server 510 may load, in a user interface of a cloud-based data management platform, an option to generate a communication channel. At 515, the user device 505 may transmit a selection of a source element and an event associated with the source element. In some examples, the user device 505 may transmit, via a user interface of cloud-based data management platform storing a set of data objects, a user input to generate a communication channel of a group-based communication platform that is separate from the cloud-based data management platform. In some examples, the communication channel may be for a data object of the set of data objects.

At 520, the application server 510 may retrieve, in response to receiving the user input, a group of users that are linked to the data object within the cloud-based data management platform. The application server 510 may then display, via the user interface, a list of options for generating the communication channel, the list of options including the group of users for including in the communication channel, a privacy level for the communication channel, and an identifier of the communication channel.

At 525, the user device 505 may transmit input to a list of options. The application server 510 may receive the input to the list of options for generating the communication channel. At 530, the application server 510 may identify a name of the communication channel based on the input to the list of options. The application server 510 may identify whether the communication channel is public or private based at least in part on the input to the list of options. Additionally or alternatively, the application server 510 may identify a selection of a subset of group of users for including in the communication channel based on the input to the list of options.

At 535, the application server 510 may generate an executable packet of instructions for ingesting into the group-based communication platform based on the input to the list of options. In some examples, the executable packet of instructions may include at least one of a communication channel identifier, a user identifier for a creator the executable packet of instructions, a user identifier for a modifier of the executable packet of instructions, a user identifier for a member of the data object, a user identifier for an owner of the data object, a privacy indicator, a record identifier, or a combination thereof.

At 540, the application server 510 may transmit the executable packet of instructions for ingesting into the group-based communication platform. At 545, the communication server 512 may generate a communication channel based on the executable packet of instructions transmitted by the application server 510.

Figure 6:
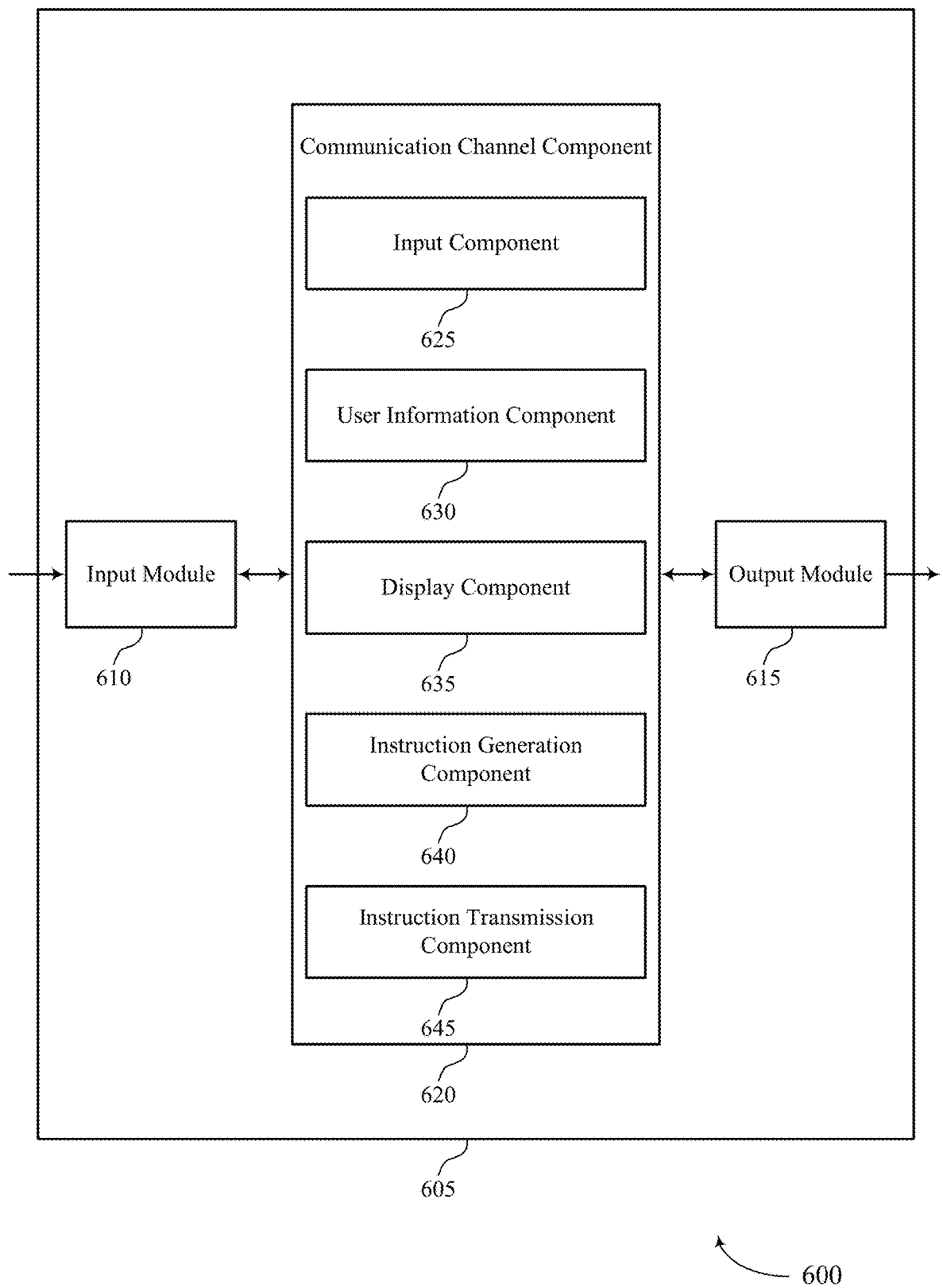
FIG. 6 shows a block diagram of an apparatus that supports methods to generate communication channel for data objects in accordance with aspects of the present disclosure.

FIG. 6 shows a block diagram 600 of a device 605 that supports methods to generate communication channel for data objects in accordance with aspects of the present disclosure. The device 605 may include an input module 610, an output module 615, and a communication channel component 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the communication channel component 620 to support methods to generate communication channel for data objects. In some cases, the input module 610 may be a component of an I/O controller 810 as described with reference to FIG. 8.

The output module 615 may manage output signals for the device 605. For example, the output module 615 may receive signals from other components of the device 605, such as the communication channel component 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the communication channel component 620 may include an input component 625, a user information component 630, a display component 635, an instruction generation component 640, an instruction transmission component 645, or any combination thereof. In some examples, the communication channel component 620, or various components thereof, may be configured to perform various operations (e.g., receiving, monitoring, transmitting) using or otherwise in cooperation with the input module 610, the output module 615, or both. For example, the communication channel component 620 may receive information from the input module 610, send information to the output module 615, or be integrated in combination with the input module 610, the output module 615, or both to receive information, transmit information, or perform various other operations as described herein.

The communication channel component 620 may support communication channel creation in accordance with examples as disclosed herein. The input component 625 may be configured as or otherwise support a means for receiving, via a user interface of cloud-based data management platform storing a plurality of data objects, a user input to generate a communication channel of a group-based communication platform that is separate from the cloud-based data management platform, wherein the communication channel is for a data object of the plurality of data objects. The user information component 630 may be configured as or otherwise support a means for retrieving, in response to receiving the user input, a group of users that are linked to the data object within the cloud-based data management platform. The display component 635 may be configured as or otherwise support a means for displaying, via the user interface, a list of options for generating the communication channel, the list of options comprising the group of users for including in the communication channel, a privacy level for the communication channel, and an identifier of the communication channel. The instruction generation component 640 may be configured as or otherwise support a means for generating an executable packet of instructions for ingesting into the group-based communication platform based at least in part on an input to the list of options. The instruction transmission component 645 may be configured as or otherwise support a means for transmitting the executable packet of instructions for ingesting into the group-based communication platform.

Figure 7:
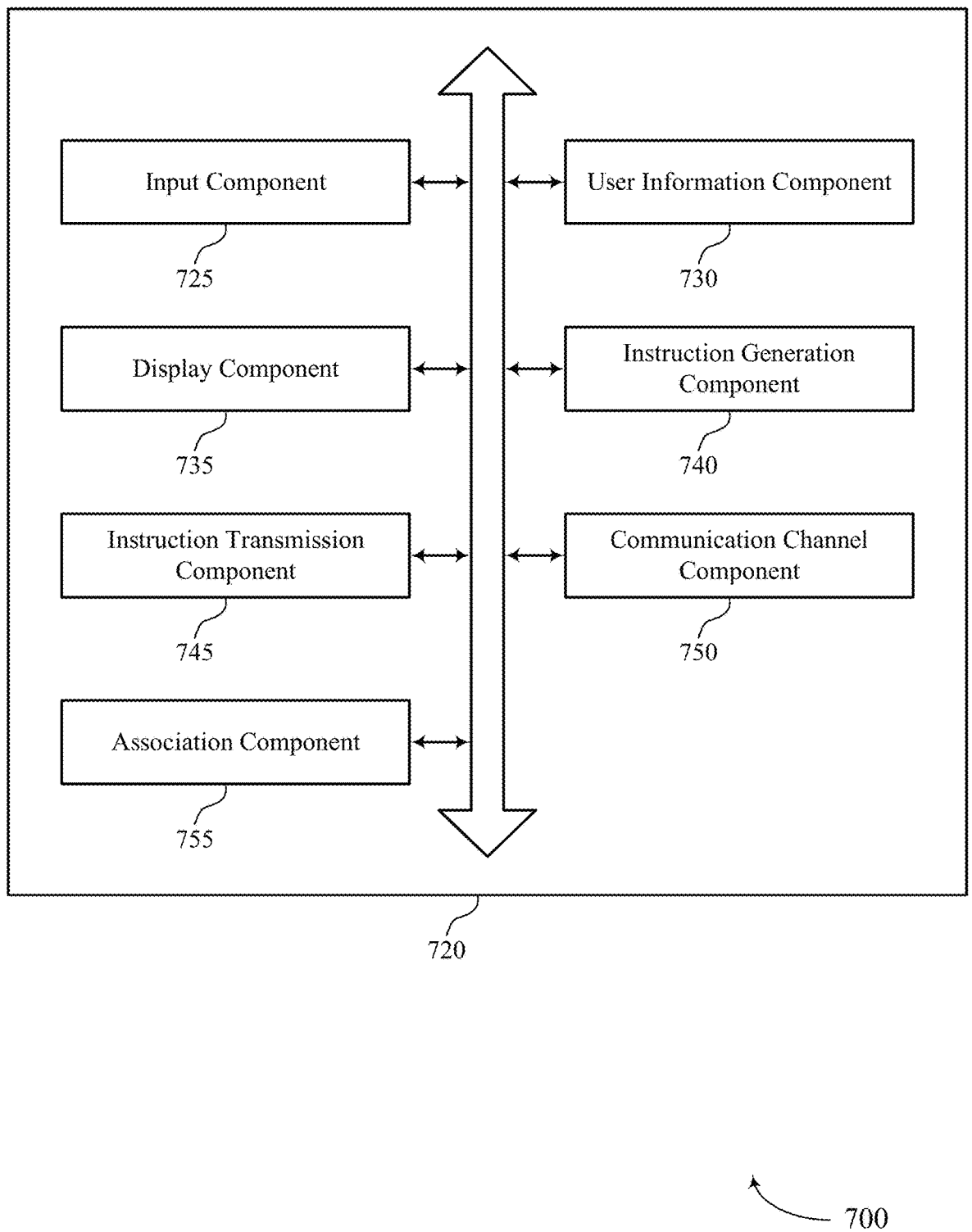
FIG. 7 shows a block diagram of a communication channel component that supports methods to generate communication channel for data objects in accordance with aspects of the present disclosure.

FIG. 7 shows a block diagram 700 of a communication channel component 720 that supports methods to generate communication channel for data objects in accordance with aspects of the present disclosure. The communication channel component 720 may be an example of aspects of a communication channel component or a communication channel component 620, or both, as described herein. The communication channel component 720, or various components thereof, may be an example of means for performing various aspects of methods to generate communication channel for data objects as described herein. For example, the communication channel component 720 may include an input component 725, a user information component 730, a display component 735, an instruction generation component 740, an instruction transmission component 745, a communication channel component 750, an association component 755, or any combination thereof. Each of these components may communicate, directly or indirectly, with one another (e.g., via one or more buses).

The communication channel component 720 may support communication channel creation in accordance with examples as disclosed herein. The input component 725 may be configured as or otherwise support a means for receiving, via a user interface of cloud-based data management platform storing a plurality of data objects, a user input to generate a communication channel of a group-based communication platform that is separate from the cloud-based data management platform, wherein the communication channel is for a data object of the plurality of data objects.

The user information component 730 may be configured as or otherwise support a means for retrieving, in response to receiving the user input, a group of users that are linked to the data object within the cloud-based data management platform. The display component 735 may be configured as or otherwise support a means for displaying, via the user interface, a list of options for generating the communication channel, the list of options comprising the group of users for including in the communication channel, a privacy level for the communication channel, and an identifier of the communication channel. The instruction generation component 740 may be configured as or otherwise support a means for generating an executable packet of instructions for ingesting into the group-based communication platform based at least in part on an input to the list of options. The instruction transmission component 745 may be configured as or otherwise support a means for transmitting the executable packet of instructions for ingesting into the group-based communication platform.

In some examples, the input component 725 may be configured as or otherwise support a means for receiving, via the user interface, the input to the list of options for generating the communication channel, wherein generating the executable packet of instructions is based at least in part on the received input.

In some examples, the communication channel component 750 may be configured as or otherwise support a means for identifying a name of the communication channel based at least in part on the input to the list of options. In some examples, the communication channel component 750 may be configured as or otherwise support a means for identifying whether the communication channel is public or private based at least in part on the input to the list of options. In some examples, the communication channel component 750 may be configured as or otherwise support a means for identifying a selection of a subset of group of users for including in the communication channel based at least in part on the input to the list of options, wherein generating the executable packet of instructions is based at least in part on identifying the name of the communication channel, whether the communication channel is public or private, and the selection of the subset of group of users.

In some examples, the communication channel component 750 may be configured as or otherwise support a means for determining an existing communication channel in the group-based communication platform for the data object of the plurality of data objects. In some examples, the communication channel component 750 may be configured as or otherwise support a means for associating the communication channel with the existing communication channel.

In some examples, the user information component 730 may be configured as or otherwise support a means for identifying a user associated with the user input to generate the communication channel of the group-based communication platform. In some examples, the display component 735 may be configured as or otherwise support a means for displaying, via the user interface, a list of communication channels for the user, wherein the user is a member of a plurality of communication channels included in the list of communication channels.

In some examples, the input component 725 may be configured as or otherwise support a means for receiving, via the user interface, the input to the list of options for generating the communication channel. In some examples, the input component 725 may be configured as or otherwise support a means for receiving, via the user interface, a second input to the list of options for generating a second communication channel. In some examples, the instruction generation component 740 may be configured as or otherwise support a means for generating a second executable packet of instructions for ingesting into the group-based communication platform based at least in part on the second input to the list of options, wherein the communication channel and the second communication channel are both for the data object of the plurality of data objects.

In some examples, the communication channel includes a first group of users and the second communication channel includes a second group of users. In some examples, the first group of users and the second group of users are the same or different. In some examples, the communication channel and the second communication channel have the same privacy levels or different privacy levels.

In some examples, the association component 755 may be configured as or otherwise support a means for associating the generated communication channel with a second data object of the plurality of data objects. In some examples, the input component 725 may be configured as or otherwise support a means for receiving a second user input to display a list of communication channels of the group-based communication platform associated with the data object of the plurality of data objects. In some examples, the display component 735 may be configured as or otherwise support a means for displaying, via the user interface, the list of communication channels in response to receiving the second user input.

In some examples, the input component 725 may be configured as or otherwise support a means for receiving an indication indicating that the communication channel is generated at the group-based communication platform. In some examples, the group of users that are linked to the data object comprise at least one of a first group of users that have access to the data object, a second group of users that follow the data object, or a combination thereof. In some examples, the executable packet of instructions comprises at least one of a communication channel identifier, a user identifier for a creator the executable packet of instructions, a user identifier for a modifier of the executable packet of instructions, a user identifier for a member of the data object, a user identifier for an owner of the data object, a privacy indicator, a record identifier, or a combination thereof.

Figure 8:
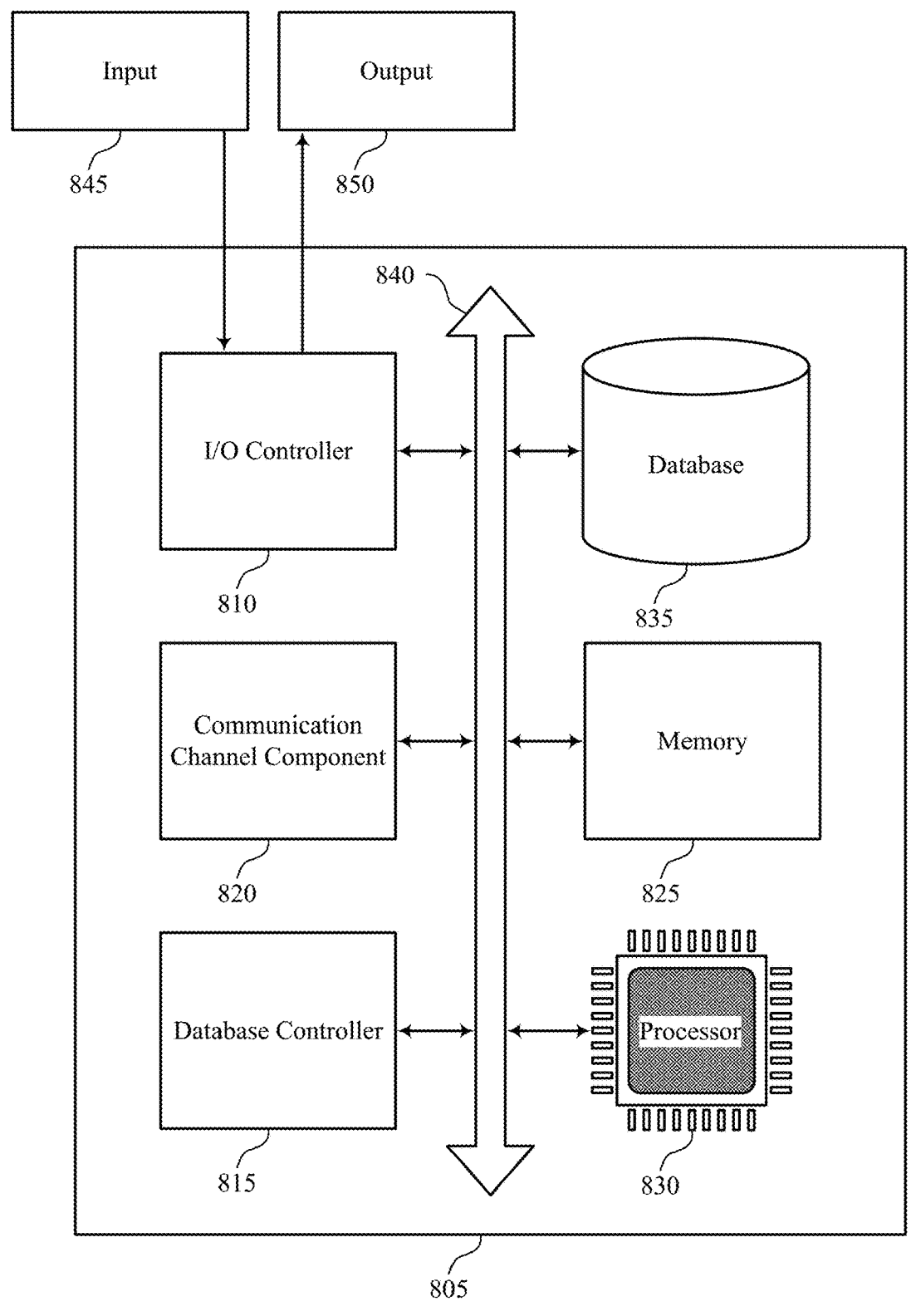
FIG. 8 shows a diagram of a system including a device that supports methods to generate communication channel for data objects in accordance with aspects of the present disclosure.

FIG. 8 shows a diagram of a system 800 including a device 805 that supports methods to generate communication channel for data objects in accordance with aspects of the present disclosure. The device 805 may be an example of or include the components of a device 605 as described herein. The device 805 may include components for bi-directional data communications including components for transmitting and receiving communications, such as a communication channel component 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting methods to generate communication channel for data objects).

The communication channel component 820 may support communication channel creation in accordance with examples as disclosed herein. For example, the communication channel component 820 may be configured as or otherwise support a means for receiving, via a user interface of cloud-based data management platform storing a plurality of data objects, a user input to generate a communication channel of a group-based communication platform that is separate from the cloud-based data management platform, wherein the communication channel is for a data object of the plurality of data objects. The communication channel component 820 may be configured as or otherwise support a means for retrieving, in response to receiving the user input, a group of users that are linked to the data object within the cloud-based data management platform. The communication channel component 820 may be configured as or otherwise support a means for displaying, via the user interface, a list of options for generating the communication channel, the list of options comprising the group of users for including in the communication channel, a privacy level for the communication channel, and an identifier of the communication channel. The communication channel component 820 may be configured as or otherwise support a means for generating an executable packet of instructions for ingesting into the group-based communication platform based at least in part on an input to the list of options. The communication channel component 820 may be configured as or otherwise support a means for transmitting the executable packet of instructions for ingesting into the group-based communication platform.

By including or configuring the communication channel component 820 in accordance with examples as described herein, the device 805 may support techniques for generating communication channels. For example, the techniques described herein may enable users of a data management platform to interact with (e.g., affect, change, update, modify) communication channels stored at or otherwise controlled by a group-based communication platform. By supporting generating communication channels from the data management platform, the device 805 may enable users to update and manage communication channels with greater efficiency, lower communication resource overhead, reduced latency, and higher user satisfaction, among other benefits.

Figure 9:
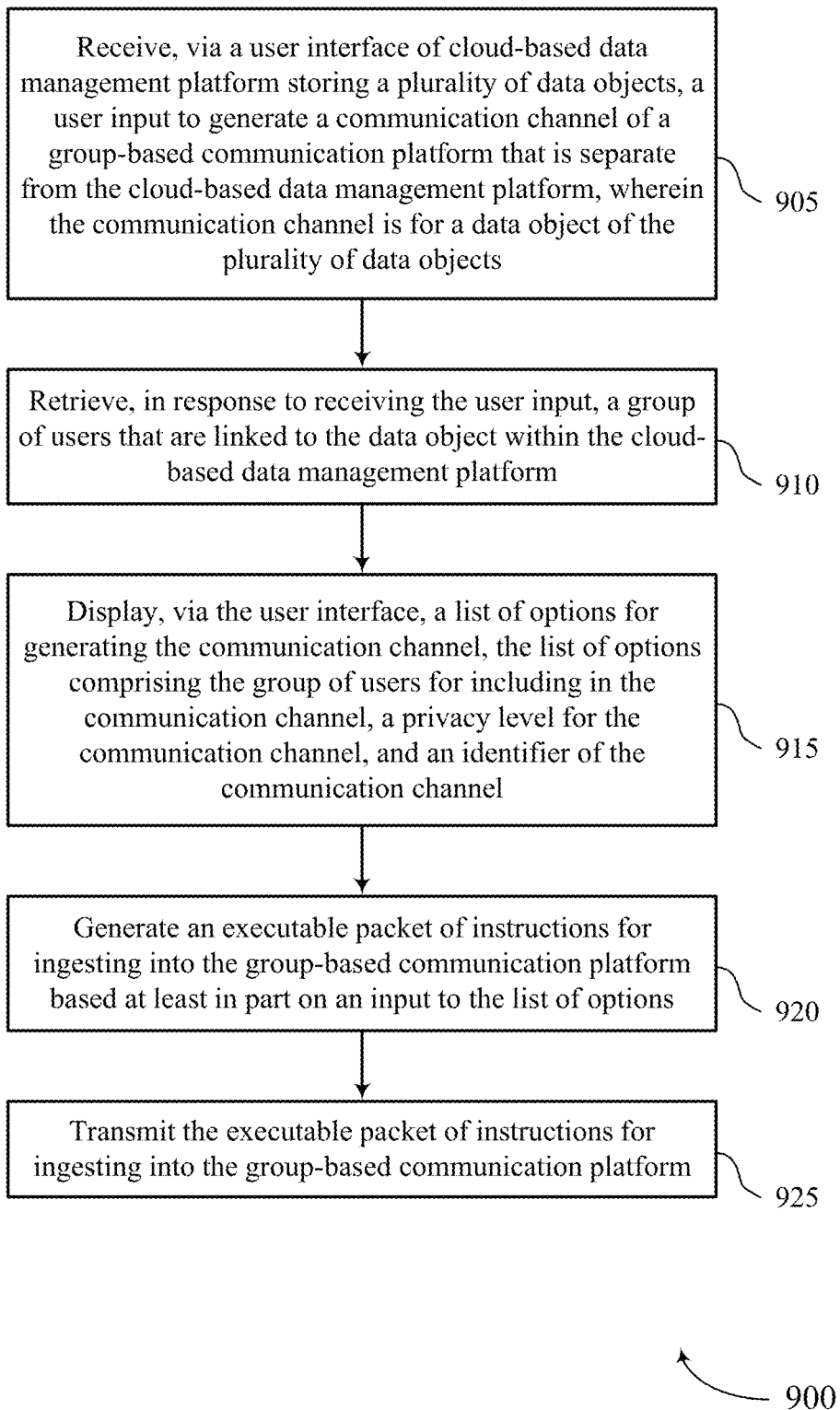
FIGS. 9 through 12 show flowcharts illustrating methods that support methods to generate communication channel for data objects in accordance with aspects of the present disclosure.

FIG. 9 shows a flowchart illustrating a method 900 that supports methods to generate communication channel for data objects in accordance with aspects of the present disclosure. The operations of the method 900 may be implemented by an application server or its components as described herein. For example, the operations of the method 900 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 905, the method may include receiving, via a user interface of cloud-based data management platform storing a plurality of data objects, a user input to generate a communication channel of a group-based communication platform that is separate from the cloud-based data management platform, wherein the communication channel is for a data object of the plurality of data objects. The operations of 905 may be performed in accordance with examples as disclosed herein. In some examples, aspects of the operations of 905 may be performed by an input component 725 as described with reference to FIG. 7.

At 910, the method may include retrieving, in response to receiving the user input, a group of users that are linked to the data object within the cloud-based data management platform. The operations of 910 may be performed in accordance with examples as disclosed herein. In some examples, aspects of the operations of 910 may be performed by a user information component 730 as described with reference to FIG. 7.

At 915, the method may include displaying, via the user interface, a list of options for generating the communication channel, the list of options comprising the group of users for including in the communication channel, a privacy level for the communication channel, and an identifier of the communication channel. The operations of 915 may be performed in accordance with examples as disclosed herein. In some examples, aspects of the operations of 915 may be performed by a display component 735 as described with reference to FIG. 7.

At 920, the method may include generating an executable packet of instructions for ingesting into the group-based communication platform based at least in part on an input to the list of options. The operations of 920 may be performed in accordance with examples as disclosed herein. In some examples, aspects of the operations of 920 may be performed by an instruction generation component 740 as described with reference to FIG. 7.

At 925, the method may include transmitting the executable packet of instructions for ingesting into the group-based communication platform. The operations of 925 may be performed in accordance with examples as disclosed herein. In some examples, aspects of the operations of 925 may be performed by an instruction transmission component 745 as described with reference to FIG. 7.

Figure 10:
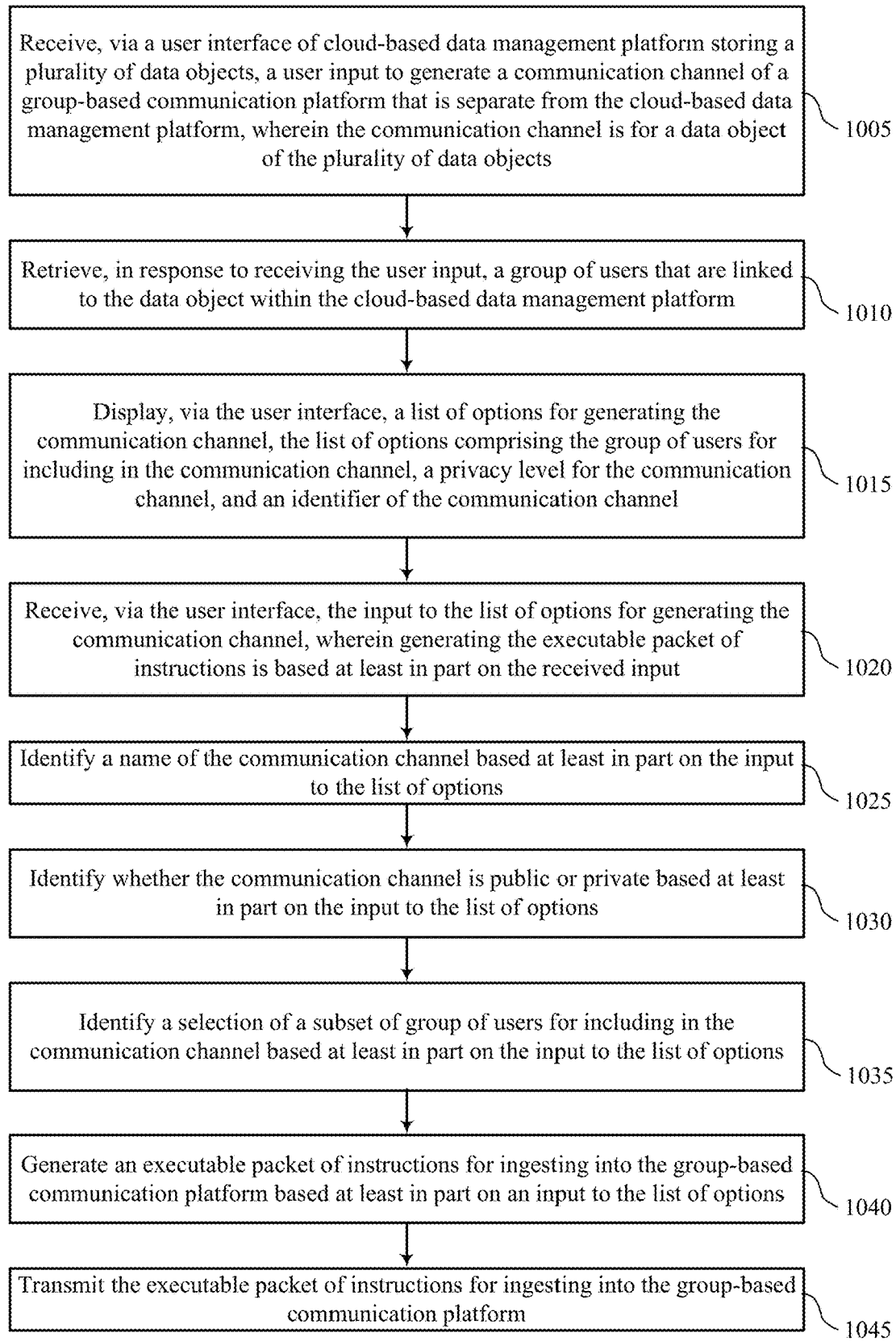

FIG. 10 shows a flowchart illustrating a method 1000 that supports methods to generate communication channel for data objects in accordance with aspects of the present disclosure. The operations of the method 1000 may be implemented by an application server or its components as described herein. For example, the operations of the method 1000 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1005, the method may include receiving, via a user interface of cloud-based data management platform storing a plurality of data objects, a user input to generate a communication channel of a group-based communication platform that is separate from the cloud-based data management platform, wherein the communication channel is for a data object of the plurality of data objects. The operations of 1005 may be performed in accordance with examples as disclosed herein. In some examples, aspects of the operations of 1005 may be performed by an input component 725 as described with reference to FIG. 7.

At 1010, the method may include retrieving, in response to receiving the user input, a group of users that are linked to the data object within the cloud-based data management platform. The operations of 1010 may be performed in accordance with examples as disclosed herein. In some examples, aspects of the operations of 1010 may be performed by a user information component 730 as described with reference to FIG. 7.

At 1015, the method may include displaying, via the user interface, a list of options for generating the communication channel, the list of options comprising the group of users for including in the communication channel, a privacy level for the communication channel, and an identifier of the communication channel. The operations of 1015 may be performed in accordance with examples as disclosed herein. In some examples, aspects of the operations of 1015 may be performed by a display component 735 as described with reference to FIG. 7.

At 1020, the method may include receiving, via the user interface, the input to the list of options for generating the communication channel, wherein generating the executable packet of instructions is based at least in part on the received input. The operations of 1020 may be performed in accordance with examples as disclosed herein. In some examples, aspects of the operations of 1020 may be performed by an input component 725 as described with reference to FIG. 7.

At 1025, the method may include identifying a name of the communication channel based at least in part on the input to the list of options. The operations of 1025 may be performed in accordance with examples as disclosed herein. In some examples, aspects of the operations of 1025 may be performed by a communication channel component 750 as described with reference to FIG. 7.

At 1030, the method may include identifying whether the communication channel is public or private based at least in part on the input to the list of options. The operations of 1030 may be performed in accordance with examples as disclosed herein. In some examples, aspects of the operations of 1030 may be performed by a communication channel component 750 as described with reference to FIG. 7.

At 1035, the method may include identifying a selection of a subset of group of users for including in the communication channel based at least in part on the input to the list of options. The operations of 1035 may be performed in accordance with examples as disclosed herein. In some examples, aspects of the operations of 1035 may be performed by a communication channel component 750 as described with reference to FIG. 7.

At 1040, the method may include generating an executable packet of instructions for ingesting into the group-based communication platform based at least in part on an input to the list of options. In some examples, generating the executable packet of instructions is based at least in part on identifying the name of the communication channel, whether the communication channel is public or private, and the selection of the subset of group of users. The operations of 1040 may be performed in accordance with examples as disclosed herein. In some examples, aspects of the operations of 1040 may be performed by an instruction generation component 740 as described with reference to FIG. 7.

At 1045, the method may include transmitting the executable packet of instructions for ingesting into the group-based communication platform. The operations of 1045 may be performed in accordance with examples as disclosed herein. In some examples, aspects of the operations of 1045 may be performed by an instruction transmission component 745 as described with reference to FIG. 7.

Figure 11:
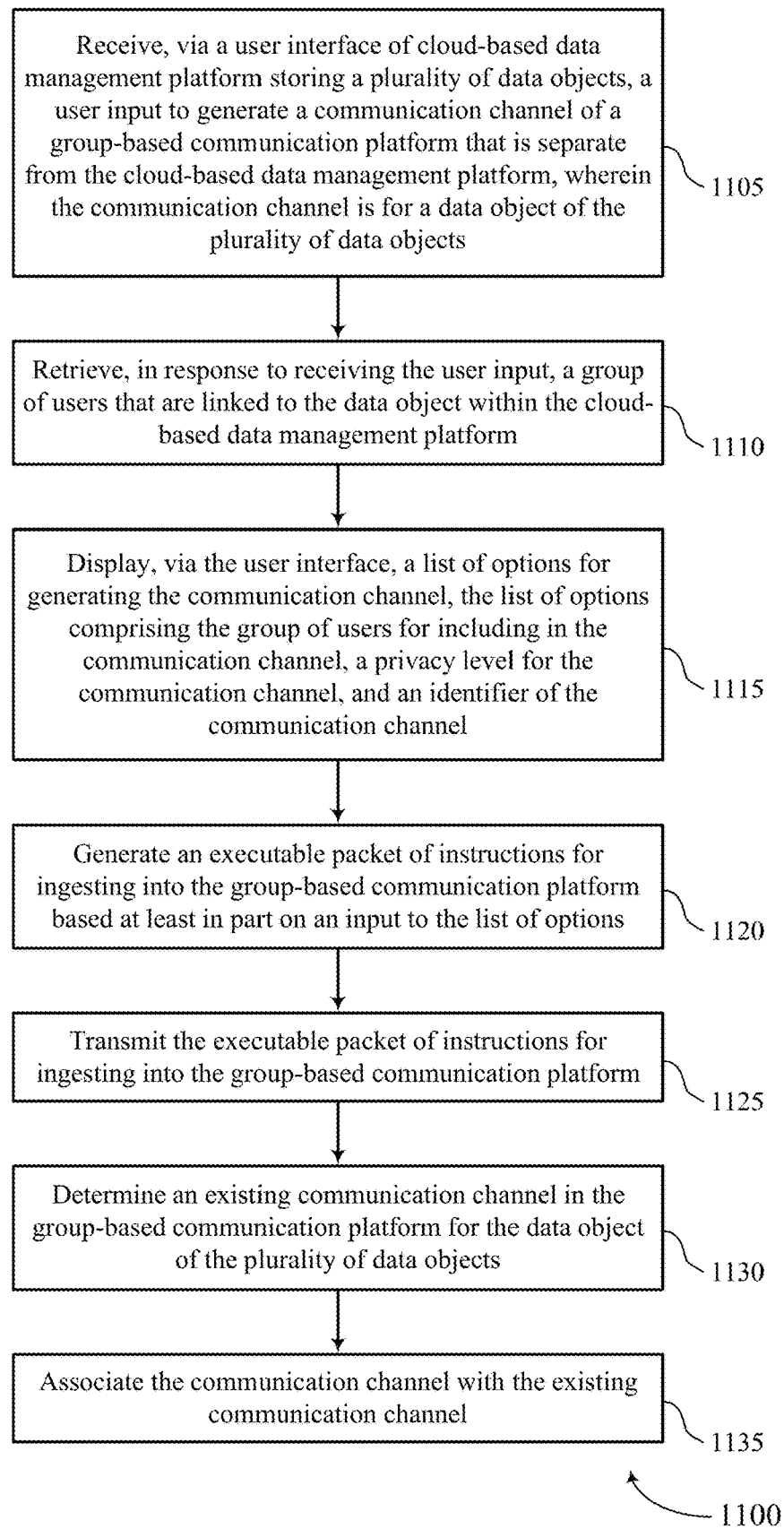

FIG. 11 shows a flowchart illustrating a method 1100 that supports methods to generate communication channel for data objects in accordance with aspects of the present disclosure. The operations of the method 1100 may be implemented by an application server or its components as described herein. For example, the operations of the method 1100 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1105, the method may include receiving, via a user interface of cloud-based data management platform storing a plurality of data objects, a user input to generate a communication channel of a group-based communication platform that is separate from the cloud-based data management platform, wherein the communication channel is for a data object of the plurality of data objects. The operations of 1105 may be performed in accordance with examples as disclosed herein. In some examples, aspects of the operations of 1105 may be performed by an input component 725 as described with reference to FIG. 7.

At 1110, the method may include retrieving, in response to receiving the user input, a group of users that are linked to the data object within the cloud-based data management platform. The operations of 1110 may be performed in accordance with examples as disclosed herein. In some examples, aspects of the operations of 1110 may be performed by a user information component 730 as described with reference to FIG. 7.

At 1115, the method may include displaying, via the user interface, a list of options for generating the communication channel, the list of options comprising the group of users for including in the communication channel, a privacy level for the communication channel, and an identifier of the communication channel. The operations of 1115 may be performed in accordance with examples as disclosed herein. In some examples, aspects of the operations of 1115 may be performed by a display component 735 as described with reference to FIG. 7.

At 1120, the method may include generating an executable packet of instructions for ingesting into the group-based communication platform based at least in part on an input to the list of options. The operations of 1120 may be performed in accordance with examples as disclosed herein. In some examples, aspects of the operations of 1120 may be performed by an instruction generation component 740 as described with reference to FIG. 7.

At 1125, the method may include transmitting the executable packet of instructions for ingesting into the group-based communication platform. The operations of 1125 may be performed in accordance with examples as disclosed herein. In some examples, aspects of the operations of 1125 may be performed by an instruction transmission component 745 as described with reference to FIG. 7.

At 1130, the method may include determining an existing communication channel in the group-based communication platform for the data object of the plurality of data objects. The operations of 1130 may be performed in accordance with examples as disclosed herein. In some examples, aspects of the operations of 1130 may be performed by a communication channel component 750 as described with reference to FIG. 7.

At 1135, the method may include associating the communication channel with the existing communication channel. The operations of 1135 may be performed in accordance with examples as disclosed herein. In some examples, aspects of the operations of 1135 may be performed by a communication channel component 750 as described with reference to FIG. 7.

Figure 12:
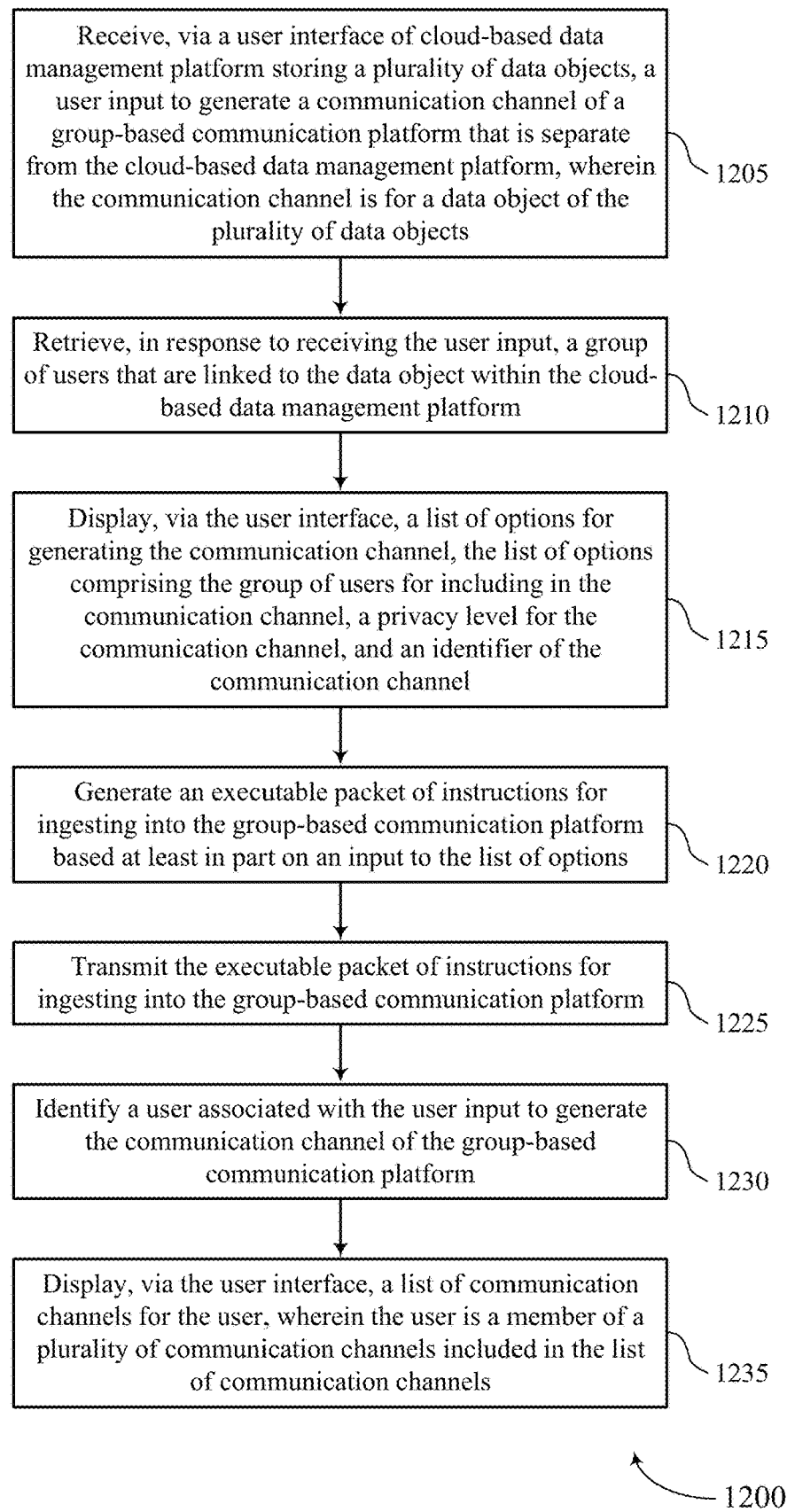

FIG. 12 shows a flowchart illustrating a method 1200 that supports methods to generate communication channel for data objects in accordance with aspects of the present disclosure. The operations of the method 1200 may be implemented by an application server or its components as described herein. For example, the operations of the method 1200 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1205, the method may include receiving, via a user interface of cloud-based data management platform storing a plurality of data objects, a user input to generate a communication channel of a group-based communication platform that is separate from the cloud-based data management platform, wherein the communication channel is for a data object of the plurality of data objects. The operations of 1205 may be performed in accordance with examples as disclosed herein. In some examples, aspects of the operations of 1205 may be performed by an input component 725 as described with reference to FIG. 7.

At 1210, the method may include retrieving, in response to receiving the user input, a group of users that are linked to the data object within the cloud-based data management platform. The operations of 1210 may be performed in accordance with examples as disclosed herein. In some examples, aspects of the operations of 1210 may be performed by a user information component 730 as described with reference to FIG. 7.

At 1215, the method may include displaying, via the user interface, a list of options for generating the communication channel, the list of options comprising the group of users for including in the communication channel, a privacy level for the communication channel, and an identifier of the communication channel. The operations of 1215 may be performed in accordance with examples as disclosed herein. In some examples, aspects of the operations of 1215 may be performed by a display component 735 as described with reference to FIG. 7.

At 1220, the method may include generating an executable packet of instructions for ingesting into the group-based communication platform based at least in part on an input to the list of options. The operations of 1220 may be performed in accordance with examples as disclosed herein. In some examples, aspects of the operations of 1220 may be performed by an instruction generation component 740 as described with reference to FIG. 7.

At 1225, the method may include transmitting the executable packet of instructions for ingesting into the group-based communication platform. The operations of 1225 may be performed in accordance with examples as disclosed herein. In some examples, aspects of the operations of 1225 may be performed by an instruction transmission component 745 as described with reference to FIG. 7.

At 1230, the method may include identifying a user associated with the user input to generate the communication channel of the group-based communication platform. The operations of 1230 may be performed in accordance with examples as disclosed herein. In some examples, aspects of the operations of 1230 may be performed by a user information component 730 as described with reference to FIG. 7.

At 1235, the method may include displaying, via the user interface, a list of communication channels for the user, wherein the user is a member of a plurality of communication channels included in the list of communication channels. The operations of 1235 may be performed in accordance with examples as disclosed herein. In some examples, aspects of the operations of 1235 may be performed by a display component 735 as described with reference to FIG. 7.

A method for communication channel creation is described. The method may include receiving, via a user interface of cloud-based data management platform storing a plurality of data objects, a user input to generate a communication channel of a group-based communication platform that is separate from the cloud-based data management platform, wherein the communication channel is for a data object of the plurality of data objects, retrieving, in response to receiving the user input, a group of users that are linked to the data object within the cloud-based data management platform, displaying, via the user interface, a list of options for generating the communication channel, the list of options comprising the group of users for including in the communication channel, a privacy level for the communication channel, and an identifier of the communication channel, generating an executable packet of instructions for ingesting into the group-based communication platform based at least in part on an input to the list of options, and transmitting the executable packet of instructions for ingesting into the group-based communication platform.

An apparatus for communication channel creation is described. The apparatus may include a processor, memory coupled with the processor, and instructions stored in the memory. The instructions may be executable by the processor to cause the apparatus to receive, via a user interface of cloud-based data management platform storing a plurality of data objects, a user input to generate a communication channel of a group-based communication platform that is separate from the cloud-based data management platform, wherein the communication channel is for a data object of the plurality of data objects, retrieve, in response to receiving the user input, a group of users that are linked to the data object within the cloud-based data management platform, display, via the user interface, a list of options for generating the communication channel, the list of options comprising the group of users for including in the communication channel, a privacy level for the communication channel, and an identifier of the communication channel, generate an executable packet of instructions for ingesting into the group-based communication platform based at least in part on an input to the list of options, and transmit the executable packet of instructions for ingesting into the group-based communication platform.

Another apparatus for communication channel creation is described. The apparatus may include means for receiving, via a user interface of cloud-based data management platform storing a plurality of data objects, a user input to generate a communication channel of a group-based communication platform that is separate from the cloud-based data management platform, wherein the communication channel is for a data object of the plurality of data objects, means for retrieving, in response to receiving the user input, a group of users that are linked to the data object within the cloud-based data management platform, means for displaying, via the user interface, a list of options for generating the communication channel, the list of options comprising the group of users for including in the communication channel, a privacy level for the communication channel, and an identifier of the communication channel, means for generating an executable packet of instructions for ingesting into the group-based communication platform based at least in part on an input to the list of options, and means for transmitting the executable packet of instructions for ingesting into the group-based communication platform.

A non-transitory computer-readable medium storing code for communication channel creation is described. The code may include instructions executable by a processor to receive, via a user interface of cloud-based data management platform storing a plurality of data objects, a user input to generate a communication channel of a group-based communication platform that is separate from the cloud-based data management platform, wherein the communication channel is for a data object of the plurality of data objects, retrieve, in response to receiving the user input, a group of users that are linked to the data object within the cloud-based data management platform, display, via the user interface, a list of options for generating the communication channel, the list of options comprising the group of users for including in the communication channel, a privacy level for the communication channel, and an identifier of the communication channel, generate an executable packet of instructions for ingesting into the group-based communication platform based at least in part on an input to the list of options, and transmit the executable packet of instructions for ingesting into the group-based communication platform.

Some examples of the method, apparatuses, and non-transitory computer-readable medium described herein may further include operations, features, means, or instructions for receiving, via the user interface, the input to the list of options for generating the communication channel, wherein generating the executable packet of instructions may be based at least in part on the received input.

Some examples of the method, apparatuses, and non-transitory computer-readable medium described herein may further include operations, features, means, or instructions for identifying a name of the communication channel based at least in part on the input to the list of options, identifying whether the communication channel may be public or private based at least in part on the input to the list of options, and identifying a selection of a subset of group of users for including in the communication channel based at least in part on the input to the list of options, wherein generating the executable packet of instructions may be based at least in part on identifying the name of the communication channel, whether the communication channel may be public or private, and the selection of the subset of group of users.

Some examples of the method, apparatuses, and non-transitory computer-readable medium described herein may further include operations, features, means, or instructions for determining an existing communication channel in the group-based communication platform for the data object of the plurality of data objects and associating the communication channel with the existing communication channel.

Some examples of the method, apparatuses, and non-transitory computer-readable medium described herein may further include operations, features, means, or instructions for identifying a user associated with the user input to generate the communication channel of the group-based communication platform and displaying, via the user interface, a list of communication channels for the user, wherein the user may be a member of a plurality of communication channels included in the list of communication channels.

Some examples of the method, apparatuses, and non-transitory computer-readable medium described herein may further include operations, features, means, or instructions for receiving, via the user interface, the input to the list of options for generating the communication channel, receiving, via the user interface, a second input to the list of options for generating a second communication channel, and generating a second executable packet of instructions for ingesting into the group-based communication platform based at least in part on the second input to the list of options, wherein the communication channel and the second communication channel may be both for the data object of the plurality of data objects.

In some examples of the method, apparatuses, and non-transitory computer-readable medium described herein, the communication channel includes a first group of users and the second communication channel includes a second group of users.

In some examples of the method, apparatuses, and non-transitory computer-readable medium described herein, the first group of users and the second group of users may be the same or different.

In some examples of the method, apparatuses, and non-transitory computer-readable medium described herein, the communication channel and the second communication channel may have the same privacy levels or different privacy levels.

Some examples of the method, apparatuses, and non-transitory computer-readable medium described herein may further include operations, features, means, or instructions for associating the generated communication channel with a second data object of the plurality of data objects.

Some examples of the method, apparatuses, and non-transitory computer-readable medium described herein may further include operations, features, means, or instructions for receiving a second user input to display a list of communication channels of the group-based communication platform associated with the data object of the plurality of data objects and displaying, via the user interface, the list of communication channels in response to receiving the second user input.

Some examples of the method, apparatuses, and non-transitory computer-readable medium described herein may further include operations, features, means, or instructions for receiving an indication indicating that the communication channel may be generated at the group-based communication platform.

In some examples of the method, apparatuses, and non-transitory computer-readable medium described herein, the group of users that may be linked to the data object comprise at least one of a first group of users that may have access to the data object, a second group of users that follow the data object, or a combination thereof.

In some examples of the method, apparatuses, and non-transitory computer-readable medium described herein, the executable packet of instructions comprises at least one of a communication channel identifier, a user identifier for a creator the executable packet of instructions, a user identifier for a modifier of the executable packet of instructions, a user identifier for a member of the data object, a user identifier for an owner of the data object, a privacy indicator, a record identifier, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communication channel creation, comprising:
   receiving, via a user interface of cloud-based data management platform storing a plurality of data objects an action triggering a generation of a communication channel for a group-based communication platform that is separate from the cloud-based data management platform, wherein the communication channel is for a data object of the plurality of data objects;
   retrieving, in response to receiving the action, a group of users that are associated with the data object within the cloud-based data management platform;
   displaying, in response to receiving the action via the user interface, a list of options for generating the communication channel, the list of options comprising the group of users for including in the communication channel, a privacy level for the communication channel, and an identifier of the communication channel;
   generating an executable packet of instructions for ingesting into the group-based communication platform based at least in part on an input to the list of options; and
   transmitting the executable packet of instructions for ingesting into the group-based communication platform.

2. The method of claim 1, further comprising:
   receiving, via the user interface, the input to the list of options for generating the communication channel, wherein generating the executable packet of instructions is based at least in part on the received input.

3. The method of claim 2, further comprising:
   identifying a name of the communication channel based at least in part on the input to the list of options;
   identifying whether the communication channel is public or private based at least in part on the input to the list of options; and
   identifying a selection of a subset of group of users for including in the communication channel based at least in part on the input to the list of options, wherein generating the executable packet of instructions is based at least in part on identifying the name of the communication channel, whether the communication channel is public or private, and the selection of the subset of group of users.

4. The method of claim 1, further comprising:
   determining an existing communication channel in the group-based communication platform for the data object of the plurality of data objects; and
   associating the communication channel with the existing communication channel.

5. The method of claim 1, further comprising:
   identifying a user associated with the action triggering the generation of the communication channel for the group-based communication platform; and
   displaying, via the user interface, a list of communication channels for the user, wherein the user is a member of a plurality of communication channels included in the list of communication channels.

6. The method of claim 1, further comprising:
   receiving, via the user interface, the input to the list of options for generating the communication channel;

receiving, via the user interface, a second input to the list of options for generating a second communication channel; and generating a second executable packet of instructions for ingesting into the group-based communication platform based at least in part on the second input to the list of options, wherein the communication channel and the second communication channel are both for the data object of the plurality of data objects.

7. The method of claim 6, wherein the communication channel includes a first group of users and the second communication channel includes a second group of users.

8. The method of claim 7, wherein the first group of users and the second group of users are the same or different.

9. The method of claim 6, wherein the communication channel and the second communication channel have the same privacy levels or different privacy levels.

10. The method of claim 1, further comprising:
associating the generated communication channel with a second data object of the plurality of data objects.

11. The method of claim 1, further comprising:
receiving a second action to display a list of communication channels of the group-based communication platform associated with the data object of the plurality of data objects; and
displaying, via the user interface, the list of communication channels in response to receiving the second action.

12. The method of claim 1, further comprising:
receiving an indication indicating that the communication channel is generated at the group-based communication platform.

13. The method of claim 1, wherein the group of users that are associated with the data object comprise at least one of a first group of users that have access to the data object, a second group of users that follow the data object, or a combination thereof.

14. The method of claim 1, wherein the executable packet of instructions comprises at least one of a communication channel identifier, a user identifier for a creator the executable packet of instructions, a user identifier for a modifier of the executable packet of instructions, a user identifier for a member of the data object, a user identifier for an owner of the data object, a privacy indicator, a record identifier, or a combination thereof.

15. An apparatus for communication channel creation, comprising:
one or more processors;
one or more memories coupled with the one or more processors; and
instructions stored in the one or more memories and executable by the one or more processors to cause the apparatus to:
receive, via a user interface of cloud-based data management platform storing a plurality of data objects, an action triggering a generation of a communication channel for a group-based communication platform that is separate from the cloud-based data management platform, wherein the communication channel is for a data object of the plurality of data objects;
retrieve, in response to receiving the action, a group of users that are associated with the data object within the cloud-based data management platform;
display, via the user interface, a list of options for generating the communication channel, the list of options comprising the group of users for including in the communication channel, a privacy level for the communication channel, and an identifier of the communication channel;
generate an executable packet of instructions for ingesting into the group-based communication platform based at least in part on an input to the list of options; and
transmit the executable packet of instructions for ingesting into the group-based communication platform.

16. The apparatus of claim 15, wherein the instructions are further executable by the one or more processors to cause the apparatus to:
receive, via the user interface, the input to the list of options for generating the communication channel, wherein generating the executable packet of instructions is based at least in part on the received input.

17. The apparatus of claim 16, wherein the instructions are further executable by the one or more processors to cause the apparatus to:
identify a name of the communication channel based at least in part on the input to the list of options;
identify whether the communication channel is public or private based at least in part on the input to the list of options; and
identify a selection of a subset of group of users for including in the communication channel based at least in part on the input to the list of options, wherein generating the executable packet of instructions is based at least in part on identifying the name of the communication channel, whether the communication channel is public or private, and the selection of the subset of group of users.

18. The apparatus of claim 15, wherein the instructions are further executable by the one or more processors to cause the apparatus to:
determine an existing communication channel in the group-based communication platform for the data object of the plurality of data objects; and
associate the communication channel with the existing communication channel.

19. The apparatus of claim 15, wherein the instructions are further executable by the one or more processors to cause the apparatus to:
identify a user associated with the action triggering the generation of the communication channel for the group-based communication platform; and
display, via the user interface, a list of communication channels for the user, wherein the user is a member of a plurality of communication channels included in the list of communication channels.

20. A non-transitory computer-readable medium storing code for communication channel creation, the code comprising instructions executable by one or more processors to:
receive, via a user interface of cloud-based data management platform storing a plurality of data objects, an action triggering a generation of a communication channel for a group-based communication platform that is separate from the cloud-based data management platform, wherein the communication channel is for a data object of the plurality of data objects;
retrieve, in response to receiving the action, a group of users that are associated with the data object within the cloud-based data management platform;
display, via the user interface, a list of options for generating the communication channel, the list of options comprising the group of users for including in the communication channel, a privacy level for the communication channel, and an identifier of the communication channel;
generate an executable packet of instructions for ingesting into the group-based communication platform based at least in part on an input to the list of options; and
transmit the executable packet of instructions for ingesting into the group-based communication platform.

* * * * *